May 18, 1965  J. PRAT  3,183,960
HEAT TRANSFER METHOD
Filed April 30, 1962  2 Sheets-Sheet 1

Inventor:
Jean Prat
by Benj. T. Rauber
attorney

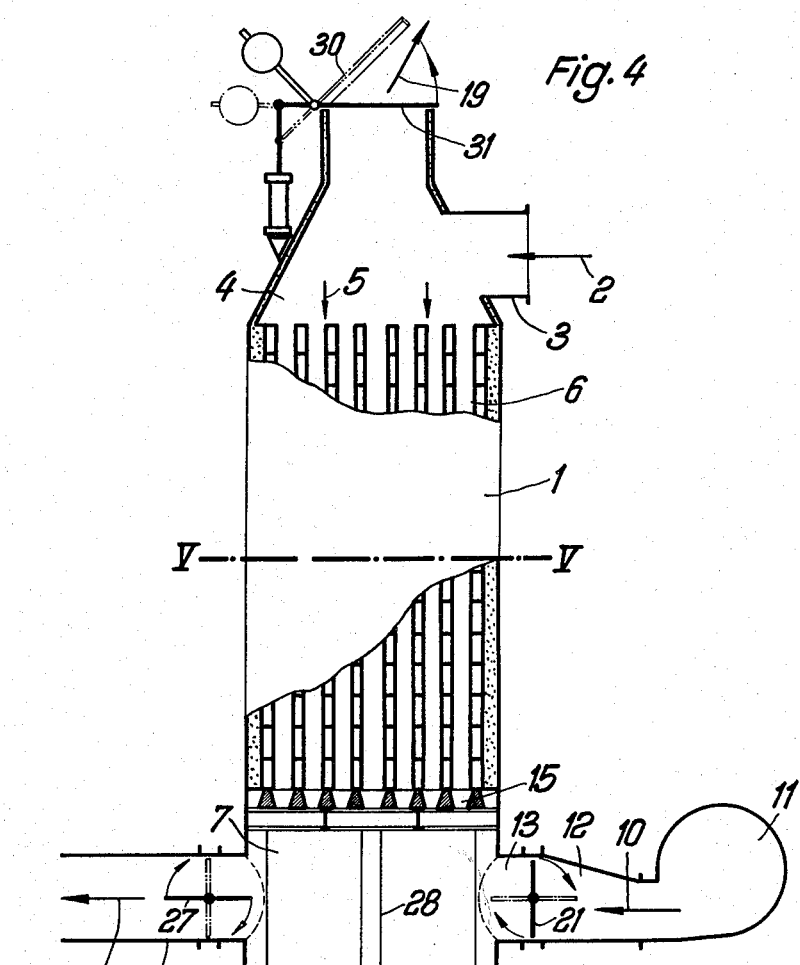
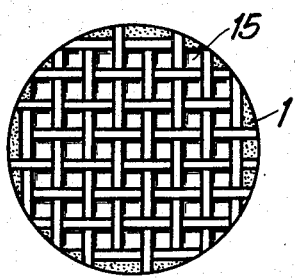

3,183,960
HEAT TRANSFER METHOD
Jean Prat, 64 Rue Miromesnil, Paris 8, France
Filed Apr. 30, 1962, Ser. No. 190,994
Claims priority, application Germany, May 5, 1961,
P 27,105
1 Claim. (Cl. 165—1)

My present invention relates to a method for the transfer of heat from hot gases supplied periodically or intermittently from a periodically or intermittently operated source of heat, such as a converter or arc furnace, to a recipient continuous air or gas stream in such manner as to cool the hot gases to a temperature at which they may be filtered to free them from particles suspended therein.

The method is used in association with an accumulator through which the hot gases, which may carry in suspension solid particles, are passed periodically. In the method of the invention the hot gases are passed through the accumulator in such manner as to free the passages of any dust particles that may lodge on the surfaces of the accumulator and to direct the particles thus freed from the accumulator into a collecting bin, thereby decreasing the load on the filter. Also the method preferably operates to reduce the temperature variations in the accumulator to a minimum and to supply heated air or gases at an approximately uniform temperature.

The method is illustrated by way of example in accumulator systems shown in the accompanying drawings, in which;

FIG. 4 is an elevation, partly in section, of another accumulator, showing the flow of the heating gas and the recipient or cooling air in a modification of the invention, and FIG. 5 is a section of the accumulator on line V—V of FIG. 4.

Figure 1:
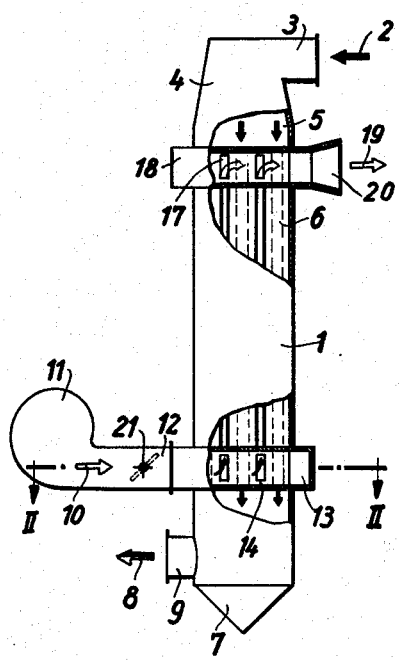
FIG. 1 is an elevation, partly in section, of an accumulator showing the manner of controlling the passage of the hot gases and the cooling air or gas.
Figure 2:
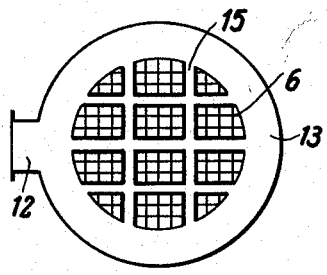
FIG. 2 is a horizontal section on line II—II of FIG. 1.

In the accumulator 1 of FIGS. 1 and 2 the hot gases, indicated by the black arrow 2, are supplied intermittently through an inlet 3 to the upper part 4 of the accumulator and thence pass downwardly through straight vertical tubes providing passages of even cross section in a checkerwork 6 to a space beneath the checkerwork above a dust bin 7 and thence outwardly, as indicated by the white arrow 8, through an outlet 9.

Cooling air 10, indicated by the white arrow 10, is supplied by a blower 11 through an inlet pipe 12 to an annular chamber encircling the accumulator at the lower end of the checkerwork 6 and passes through openings 14 into a grid type of header 15 connected to vertical passages extending at spaced positions upwardly through the accumulator in heat receiving relation to the checkerwork 6. From the upper ends of the air passages the air passes from a grid header similar to the header 15 and thence through openings 17 into an annular chamber 18 and then, as indicated by the white arrow 19, through an outlet 20 for use or other disposal. The rate of flow of the air into the annular chamber 13 is controlled by a damper 21 in the outlet 12 in accordance with the method of the present invention to maintain a constant, unvarying, temperature of the heated air delivered through the outlet, that is, the temperature curve on a temperature-time graph will approximate a straight line. The damper 21 may be controlled by any suitable thermostatic control.

The hot gases delivered to the vertical tubes or passages of even or uniform cross-section in the checkerwork of the accumulator generally contain suspended particles some of which would tend to adhere to the relatively cooler surfaces of the checkerwork to build up deposits thereon. Such deposits if built up sufficiently obstruct the passages through the checkerwork and also insulate the checkerwork from the hot gases thereby reducing the flow of heat from the hot gases to the checkerwork and the cooling of the hot gases. In accordance with the method of the invention, hot gases are passed through the passages of the accumulator with a velocity of not less than fourteen meters per second. This velocity together with the downward direction of the gases detaches any deposits as they are formed on the surfaces of the passages and projects them into the dust bin 7 while the gases now cooled to a temperature below which the filters might be injuriously affected and with a reduced content of suspended particles pass through the outlet. By thus maintaining the velocity of the gases above the lower limit of fourteen meters per second the effectiveness of heat transfer to the checkerwork is maintained at a maximum and the burden of suspended particles to be filtered by the filters is reduced.

By passing the cold air through the accumulator during the passage of the hot gases therethrough as well as in the intervals between the passage of hot gases, heat is abstracted by the cold air during the passage of the hot gases and accordingly the amount of heat absorbed by the checkerwork during these periods is reduced. The temperature to which the checkerwork is heated during these periods is accordingly less than if the cold air were not passed through. This decreases the variations in temperature of the checkerwork and maintains it at a lower temperature increasing the effectiveness of heat transfer from the hot gases.

Figure 3:
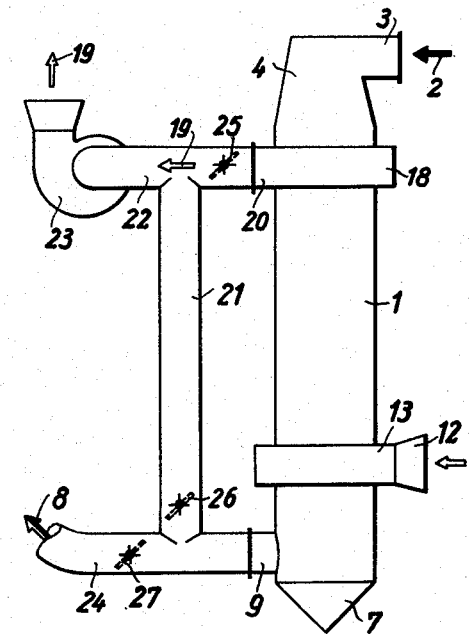
FIG. 3 is a vertical section of a modification of the accumulator shown in FIGS. 1 and 2.

The modification illustrated in FIG. 3 is similar to that of FIGS. 1 and 2 and corresponding parts are identified with the same reference numerals but, instead of the blower 11 an exhaust fan 23 is connected to the outlet 20 by means of a conduit 22 and the conduit 22 is connected by a conduit 21 to a conduit 24 from the hot gas outlet 9. Control dampers 25, 26 and 27 are provided in the conduits 22, 21 and 24, respectively.

In this embodiment, during the period when the hot gases pass through the accumulator the dampers 25 and 27 are open and the damper 26 is closed. The amount of atmospheric air 19 to be heated and the speed of the fan 23 are maintained constant and the hotter the accumulator becomes the more the damper 25 is opened. It may be opened by a thermostatic control system such as is known in the art. Toward the end of the period in which hot gases are supplied the damper 26 is gradually opened and the damper 27 correspondingly gradually closed so that during the periods in which the hot gases are not supplied air may be drawn through the air passages in the accumulator and through the checker-work in proportion to supply the required heated air at the required temperature.

In a system in which the blowing periods during which hot gases are supplied and the amount and temperature of the hot gases are regular and uniform and their relation to the capacity of the accumulator are known a control program for the dampers 25–27 can be secured in a manner known in the art to provide a gas cycle depending on the amount of the air and exhaust gas to maintain constant temperatures of the air and gas. By a suitable adjustment of this control system the dampers 26 and 27 may control either the amount or the temperature of the air drawn through by the fan 23.

In the modification shown in FIGS. 4 and 5 the annular chambers 13 and 18 and the grids 15 and separate passages for the air to be heated and for the hot gases are omitted and the accumulator has smooth wall vertical passages 6 for the passage of the air and gas. The surfaces of these passages are in direct contact with the hot gas passing through the accumulator. The dust bin is accessible through gates 28. Air may be admitted to the dust bin from a fan 11 and a conduit 12 controlled by a damper 21. When the damper 21 is opened and the outlet damper 31 closed a blast of air is admitted to the dust bin to blow the accumulation of dust from the bin to the filters so that when the outlet damper 31 is opened clean air will pass through the accumulator passages to the atmosphere. Air passes upwardly through the passages 6 and out through an exhaust passage 31 when the cover closure 30 is open and the damper 21 is open and the damper 27 is closed. During the cooling of the hot gases by passage downwardly through the accumulator passages 6, the partially cooled gases from the accumulator may be diluted by opening the dampers 27 and 21 so that air supplied by the fan 11 may mix with the gases from the accumulator to lower the temperature within the limits suitable for passage through the cloth filters.

It may be noted that when there is no use for the hot air passing through the accumulator, the fan 11 (FIG. 4) requires less power to operate than the fan 23 (FIG. 3).

In the method illustrated in this embodiment, at the beginning of the cycle in which the hot gas is passed through the accumulator and the accumulator is at its lowest temperature, the gas will be cooled to the required temperature. As the accumulator is heated to a higher temperature by the hot gas cold air may be admitted from the blower 11 by opening the damper 21 gradually to admit cold air to the cooled gas to bring it to the required low temperature for filtering. At the close of the cycle, when hot gas is no longer supplied to the accumulator, the damper 27 is closed and the damper 21 and the cover damper 30 are completely open to cause the cold air to pass upwardly through the passages 60 to cool them and is exhausted through the open cover damper 30. In the method of this modification the dampers may be controlled by a suitable thermostatic control operated by the temperature of the exhaust gases. The method controls the temperature of the exhaust gases for filtering but does not supply a continuous supply of heated air, the air being exhausted to atmosphere.

Through the method of my invention, the surfaces of the accumulator are freed from accumulation of particles and these particles are separated from the cooled gases before the gases are supplied to the filters. Variations in the accumulator are reduced and an effective cooling of the gases is obtained. By means of the method of my invention a continuous supply of air or other gas may be obtained at a constant rate and a uniform unvarying temperature.

Having described my invention, I claim:

A method for the transfer of heat from an intermittent supply of hot gases from converters or arc furnaces which comprises passing said hot gases downwardly through passages of uniform cross-section of an accumulator during successive interrupted intervals of time at a velocity of more than fourteen meters per second to maintain said passages free from accumulation of particles and to carry said particles directly downwardly and deposit them out of said gas stream, passing air through the passages for the hot gases between said intervals in which the supply of hot gases is interrupted and mixing air with the cooled gases leaving the accumulator during the periods when the hot gases are supplied to the accumulator to reduce the temperature of the gases supplied for filtration.

References Cited by the Examiner
UNITED STATES PATENTS

| | | | |
|---|---|---|---|
| 1,724,848 | 8/29 | McGee | 263—19 |
| 1,941,976 | 1/34 | Etherington | 263—19 |
| 2,737,132 | 3/56 | Ames | 165—134 |

CHARLES SUKALO, *Primary Examiner.*